Jan. 8, 1946.    J. N. ANDERSON ET AL    2,392,355
INDICATING SYSTEM
Filed Oct. 10, 1942    7 Sheets-Sheet 2

INVENTORS
J. N. ANDERSON
R. HOOVER
BY W.C. Middleton
ATTORNEY

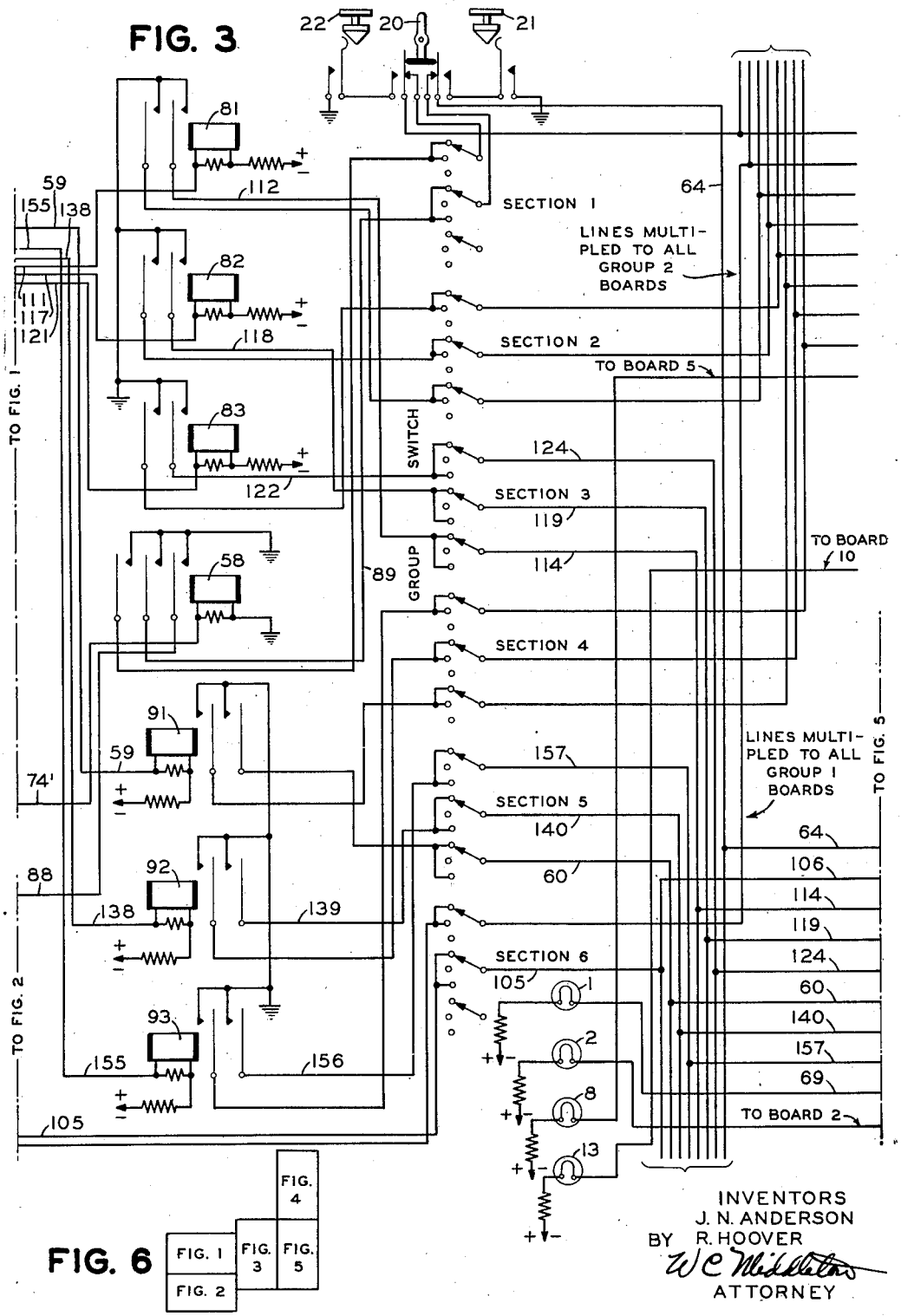
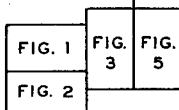

Jan. 8, 1946. J. N. ANDERSON ET AL 2,392,355
INDICATING SYSTEM
Filed Oct. 10, 1942 7 Sheets-Sheet 4

INVENTORS
J. N. ANDERSON
R. HOOVER
BY WC Middleton
ATTORNEY

Jan. 8, 1946.   J. N. ANDERSON ET AL   2,392,355
INDICATING SYSTEM
Filed Oct. 10, 1942   7 Sheets-Sheet 6
FIG. 7
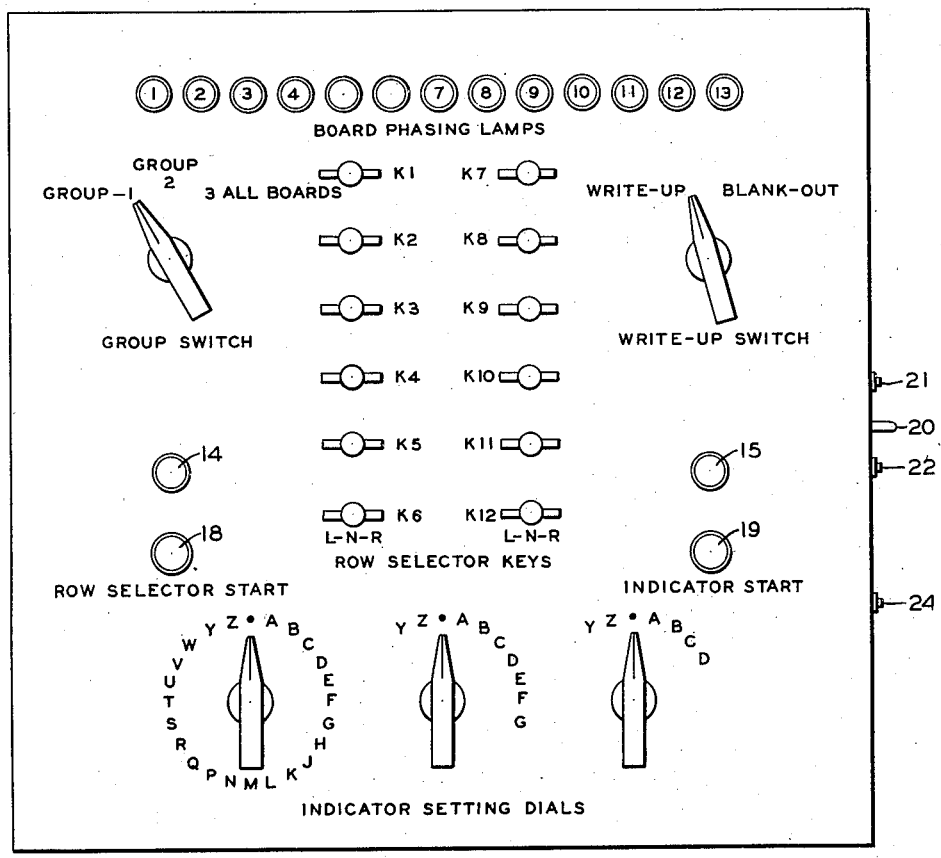
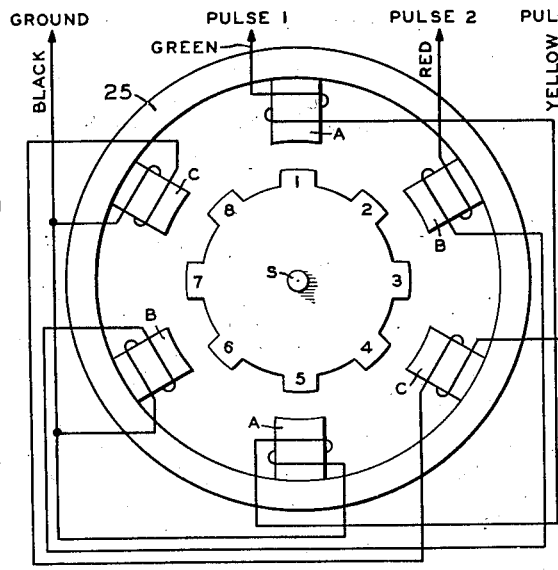
FIG. 9
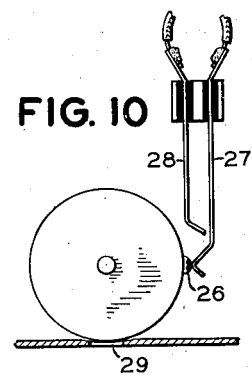
FIG. 10
INVENTORS
J. N. ANDERSON
R. HOOVER
BY W C Middleton
ATTORNEY Jan. 8, 1946.  J. N. ANDERSON ET AL  2,392,355
INDICATING SYSTEM
Filed Oct. 10, 1942  7 Sheets-Sheet 7
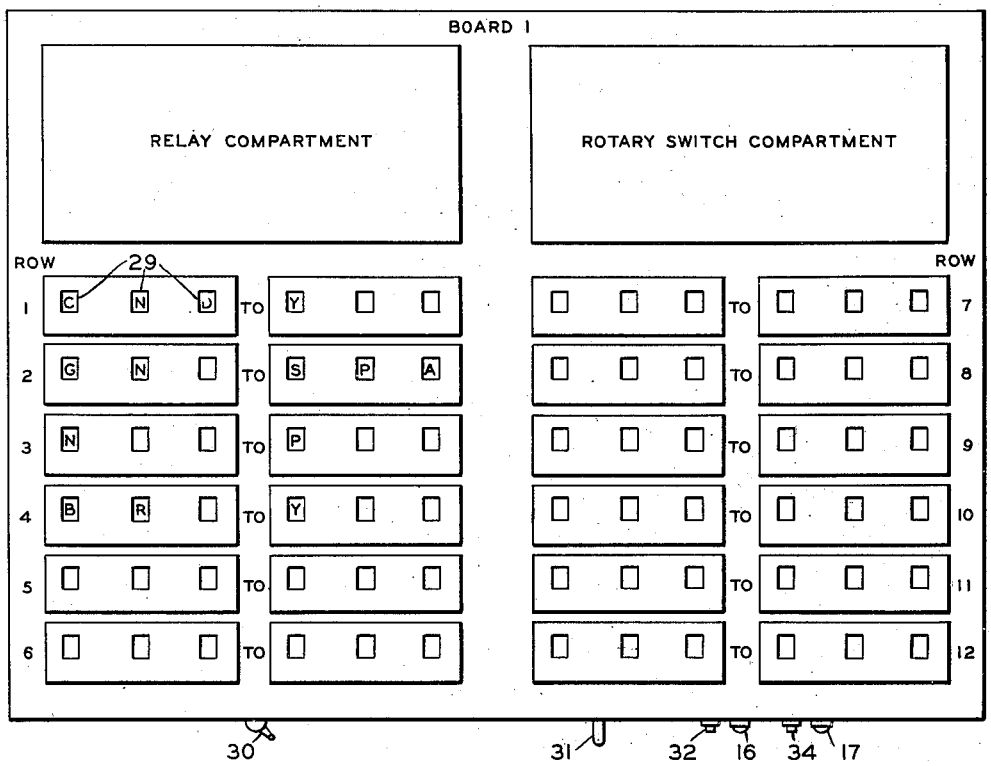
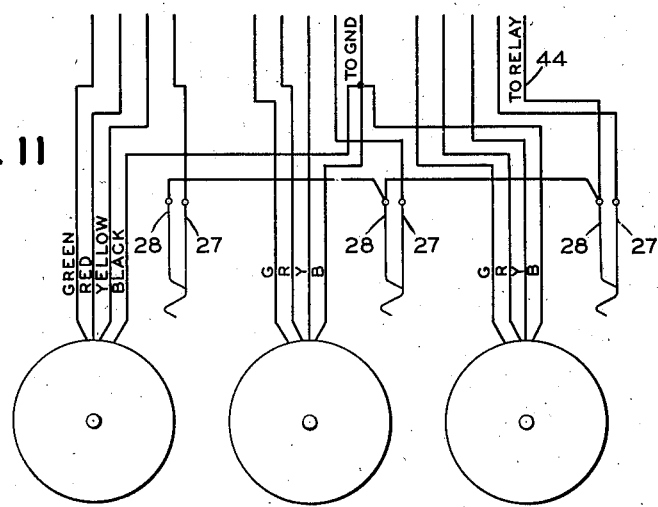
INVENTORS
J. N. ANDERSON
R. HOOVER
BY
ATTORNEY Patented Jan. 8, 1946

2,392,355

UNITED STATES PATENT OFFICE 2,392,355

INDICATING SYSTEM

James N. Anderson, North Plainfield, and Ray Hoover, Plainfield, N. J., assignors to The Western Union Telegraph Company, New York, N. Y., a corporation of New York Application October 10, 1942, Serial No. 461,534

10 Claims. (Cl. 177—353)

This invention relates to improvements in indicating systems, and more particularly to improvements in such systems as may be especially adaptable for use in telegraph central offices or switching centers.

In the operation of a telegraph system and particularly in switching centers therefor, the necessity often arises for routing business in channels other than those ordinarily used. Such necessity may arise from an overloading of the normal channels due to press of business, from failure of some of the usual channels or from failure of all of the usual channels. In such instances it is desirable that part or all of the business normally conducted over certain channels be directed to other channels, and it is further desirable that the equipment attendants be visually notified of such changes in routing.

An object of the present invention is to provide an indicating system made up of a plurality of boards each having a plurality of indicating members arranged in rows of banks, each member having indicia thereon which can be moved selectively into register with the windows in the boards, together with control equipment for causing movement of members in sequence in a selected bank of a desired row.

Another object of the invention is to provide, in a system of the foregoing character, means for moving the indicia members progressively in response to impulses applied serially until the desired setting is reached.

Another object of the invention is to provide, in a system in accordance with the foregoing, mechanism for selecting a combination of boards, the movable members of corresponding banks of which are to be actuated in predetermined fashion.

Another object of the invention is to provide, in such indicating systems, mechanism for selecting a bank of movable members to be connected to a source of impulses for actuating such members.

A further object of the invention is to provide, in an indicating system as previously described, means whereby one member of a selected bank is actuated to a desired setting before the next member is actuated, with the actuation of the members in a bank being accomplished individually in sequence in accordance with a predetermined order.

A further object of the invention is to provide means whereby the bank selecting equipment is automatically restored to initial position at the completion of actuation of all members having indicia thereon in a selected bank.

Another object of the invention is to provide means whereby the mechanism controlling actuation of the indicia members can be operated to cause movement of such members to selected variable settings, or can be operated to move such members from any combination of settings to their individual similar starting positions.

A still further object of the invention is to provide a master row and bank selector switch controlling selector switches at the indicator boards in such fashion that the master switch and the board switches of a chosen combination of boards can be operated to move in unison.

An additional object of the invention is to provide manually operated auxiliary means whereby the master selector switch can be actuated independently of the board switches; manually operated auxiliary means for actuating the board switches of a group in unison independently of the master switch; and manually operated auxiliary means for actuating the selector switches of a board independently of the switches at other boards and of the master switch.

In carrying out the foregoing and other objects of the invention, the equipment used in an indicating system as previously described comprises a number of indicating boards, each of which has a plurality of rows of indicating members preferably arranged in banks with windows in front of each indicator member so that indicia thereon can be visible through the window. The boards may be strategically positioned relative to the equipment in a switching center so that attendants of this equipment can determine at any given time whether normal channels of communication are to be used in a particular instance or whether business intended for such channels should be routed over other channels. The plurality of indicator members are controlled from a central station which is usually located at the supervisor's station in the switching center, provision being made for automatically accomplishing the posting of information either by groups of boards or by posting all of the boards simultaneously. The grouping of the boards can be arranged in relation to the equipment at the switching center so that, while some equipment will be used for transacting business over the normal channels, other equipment may be used for routing business from normal channels to other channels.

The control station has associated therewith a master switch for selecting the particular bank of a desired row in which information is to be posted, such master switch controlling similar switches located at the individual boards. In addition, the control station has associated therewith switching mechanism for determining certain combinations of boards to be posted at any time, such as groups of boards separately, or all boards of the system simultaneously. The control station in addition has counting rotary switches of a number corresponding to the number of indicating members in a bank, which counting switches can be connected to indicator setting switches which are operated to select the setting desired in each movable member of a bank. Intermittent impulses can be supplied to actuate the master row selector switch and the counting switches as well as certain relays which are controlled thereby in such fashion that impulses, under the control of relays at the various boards, can be applied selectively to the movable indicator members of a bank in sequence. Thus, while one member of a bank is being actuated to the desired setting, each and every other member of this bank remains stationary, due to the control exercised over the source of impulses for moving the indicator members, but provision is made for transferring this control from one indicator member (through the agency of the counting switches) to the next indicator member as soon as a preceding indicator member has reached the desired setting. Mechanism is provided for automatically restoring the row and bank selector switches to initial or home position at the completion of movement of the last member in a bank.

The posting of the indicator members, i. e., movement from initial blank position to desired variable positions, is under the control of switch mechanism which has a second position, i. e., blank-out position, used when it is desired that boards previously posted be returned to initial or blank position. When such movement is to be accomplished, the indicator members are again actuated individually in sequence, provision being made for arresting movement of each indicator as soon as it reaches its initial or blank position without interfering with the normal operation of the counter switches associated therewith, again with transfer of the impulse control from one switch to the next and from one indicator member to the next as the initial starting position of a preceding member is reached.

Signal lamps are provided at the control station for indicating to the operator or supervisor certain conditions, such as synchronism or phase of board selector switches, as well as the master selector switch, completion of selection by the apparatus of a bank in a row, and completion of a movement of indicator members in a selected bank. Initially all selector switches should be at their starting or home positions, and when such condition prevails the lamp associated with the master switch will be illuminated as well as the individual lamps associated with the various boards. Should any or all of these lamps be dark at the beginning of a posting, that condition is a true indication that the selector switches must be synchronized and means are provided whereby the master switch can be independently operated until its indicating lamp is illuminated; the switches of the boards of a group can be stepped around until they are at home position; or the selector switches of any board can be manually operated until they are in proper synchronization.

In the operation of this system power switches are turned to the on position at all boards and then the main power switch is thrown to on position. If all selector switch lamps are illuminated, the system is ready for posting, but if any of these lamps be dark the switches must be phased or synchronized in a manner to be explained later. After all switch lamps are lighted, the combination of boards to be posted is chosen, i. e., group 1, group 2, or all boards, and then the row of indicators to be posted is chosen by movement of the key switch of that row to the left, which also selects the left bank of that row. The selector starting switch is actuated, starting the master selector switch and the board selector switches to stepping in unison until they reach their points corresponding to the selected bank, at which time the lamp above the selector starting switch is energized. During this stepping operation the supervisor may adjust the setting dials or switches to the letters to be posted on the indicators. If various letters are desired the write-up switch is moved to write-up position, and after the lamp just mentioned shows completion of bank selecting the indicator start switch is actuated, starting the first counting switch to stepping. When it reaches the point connected to the selected point on the first dial, it stops stepping, and the second counting switch begins stepping. The same operation continues to the third switch. During stepping of these switches the three indicators are moved, each under control of its counting switch, to selected settings. When the last indicator has been set, the lamp above the indicator start switch lights, showing that posting has been completed. The same key switch may then be moved to the right, selection of the right bank made as before, the dials set for desired letters, and then the indicators of the right bank moved to positions corresponding to the dial setting, as set forth above.

To blank-out an existing setting of the two banks of a row, the same procedure is followed; however, with the write-up switch thrown to blank-out position, and the result will be a return of indicators to their initial or blank positions.

Certain automatic operations of the selector and counting switches and relays associated therewith will be explained in the detailed description of the system and its mechanism.

Other features, objects and advantages of the invention will become apparent by reference to the following detailed description of the accompanying drawings, wherein:

Figs. 1 to 5, inclusive, collectively represent a schematic circuit diagram of an indicating system embodying the invention with such circuits traced thereon as are necessary for a complete comprehension of the invention;

Fig. 6 is a layout of the manner in which Figs. 1 to 5, inclusive, can be combined to form a complete circuit diagram;

Fig. 7 is a front elevation of a control panel or station showing the row of selector switches, group switch, write-up switch, indicator setting dials, and various signal lamps;

Fig. 8 is a front elevation of one of the indicator boards showing the rows of banks of indicator members;

Fig. 9 is a schematic circuit diagram of the motor utilized in connection with each of the indicator members;

Fig. 10 is a showing substantially in the nature of a plan view of the top of an indicator drum with contacts associated therewith; and Fig. 11 is a circuit diagram of the indicator motors of a bank with their leads connected thereto.

Control panel

Figure 1:
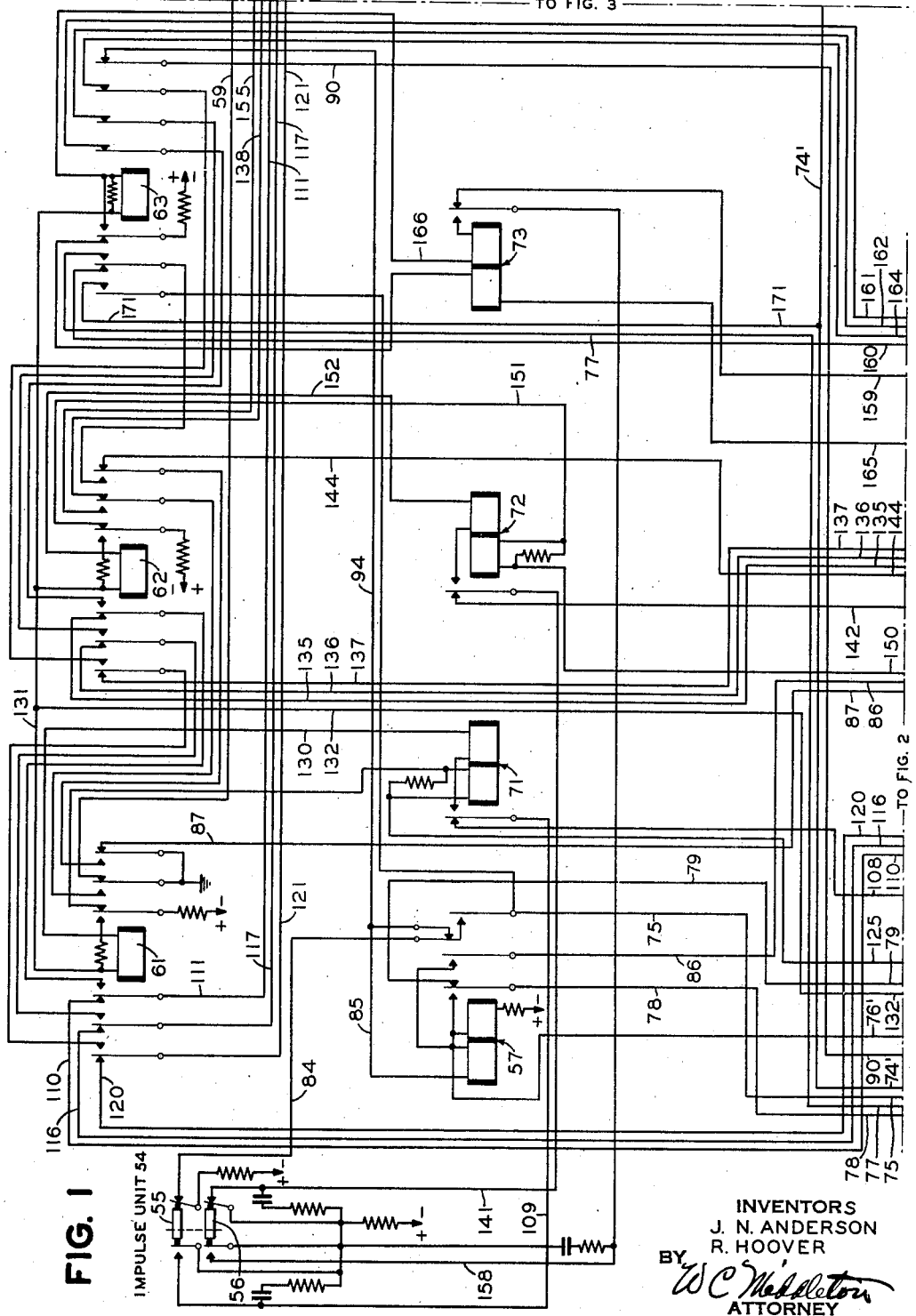

Referring now to the drawings, Fig. 7 represents a control panel for all of the routing boards used in a central telegraph office or switching center. The panel shown in this figure has a row of lights or lamps at the top thereof, thirteen in number, of which the first four are numbered consecutively, the next two are blank, and the next seven are again numbered consecutively. This control panel was originally designed to handle an installation incorporating twelve indicator boards, but in the arrangement actually used in practice only ten boards are employed. These boards are connected in two groups, specified group 1 and group 2, with the lamps 1 to 4, inclusive, associated with the respective boards 1 to 4 of group 1 and the lamps 8 to 13, inclusive, associated with the respective boards 5 to 10, inclusive, comprising group 2. The lamp 7 serves as a signal lamp in a manner to be described later.

Also in this panel is located a group switch which has three positions, as shown by the pointer, such pointer being movable to indicate either group 1, group 2, or in the third position all of the boards, i. e., both groups 1 and 2. Twelve three-position key switches numbered consecutively K1 to K12, inclusive, are positioned on the panel, each of such key switches having a normal or median position, as shown, and being movable either to the left or right to select sets of indicators in a manner to be described later. A write-up switch opposite the group switch is provided, such switch being movable either to write-up position or to blank-out position. A signal lamp 14 is positioned immediately above a switch 18, while a second signal lamp 15 is positioned above another switch 19. Three indicator dials are shown at the bottom of the panel, such dials having twenty-four settings thereon, which settings correspond to twenty-three letters of the alphabet (letters I, O and X having been omitted), and a blank point, or dot, so positioned that the pointer of the dial is in vertical position when aligned therewith.

Located at one side of the board is a toggle switch 20 with push button switches 21 and 22 on opposite sides thereof. Also on the side of the panel is a third push button switch 24. The purpose of these various switches will be described in connection with the explanation of the circuits employed in connection therewith.

Indicator board and drum motor

Fig. 8 represents an indicator board of which, as before mentioned, the present installation employs ten, four in one group and six in another group. Since the boards are identical in construction, only one has been illustrated, and it is to be assumed that, while the legend "Board 1" has been applied thereto, each and every other board will be of similar character. This board has twelve rows of windows indicated by the legends Row 1 to Row 12, inclusive. In each row provision is made for a left hand bank of three windows spaced horizontally from a right hand bank of three windows. Behind each window on a vertical axis is mounted a rotatable drum on which appear twenty-three letters of the alphabet and a blank. These letters are spaced 15° apart around the drum and in horizontal disposition. Each drum is mounted directly on the motor shaft of an impulse motor so constructed that it is capable of rotation through 15° upon the application of each of a series of impulses. A complete alphabet drum has not been illustrated herein, but numerous windows 29 on Board 1 have been shown as being occupied by various letters of the alphabet.

A partial showing of a motor for rotating an alphabet drum has been made in Fig. 9 wherein it will be seen that the shaft S has a rotor thereon provided with eight teeth (numbered 1 to 8) spaced apart at their radial center lines substantially 45°. The stator of this motor consist of a continuous ring 25 of magnetic iron and six field poles with their windings evenly spaced around the inside so that their inside ends almost touch the teeth on the rotor. Since these field poles are six in number, they are spaced apart with regard to their radial center lines 60°. The windings on diametrically opposite poles are connected in series so that the stator actually has three pairs of poles, each with a magnetic path through the outer ring, across the air gap between the poles and rotor and through the rotor. The three groups of poles have been given the legends A, B and C, respectively. In the diagram it will be seen that teeth 1 and 5 are lined up with the poles A. Consequently, if these poles are energized, they will tend to hold the rotor in the position shown. If the poles B are then energized, teeth 2 and 6 will be drawn into alignment therewith, advancing the rotor 15°. If the poles C are next energized, teeth 3 and 7, previously advanced, will be drawn into alignment therewith, again advancing the rotor 15°, and upon the resumption of energization of the poles in sequence A, B and C continued advance of the rotor, each time through an angle of 15°, will be accomplished. Each pair of poles has a feed line, and each in turn is connected to ground. For the purpose of aiding in understanding the circuit operations in connection with the individual motors hereinafter to be set forth, the supply line of pair A has been given the legend "Green," that of pair B the legend "Red," that of pair C the legend "Yellow," and the ground connection or line the legend "Black."

In addition, the top of the indicator drum has been shown schematically in Fig. 10, in which it will be seen that the drum has a stud 26 thereon, which stud is designed to open a contact between a spring finger 27 and a stationary finger 28 when the alphabet drum is positioned with the blank thereon in line with window 29 in the indicator panel. The two contacts 27 and 28 are connected in the circuit of the system in a manner to be described later.

A further showing of circuit connections to the three motors located in a group at either side of each individual row has been shown in Fig. 11, and from this figure it will be seen that the contacts 28 of each motor have a common line extending to relay 44, while each contact 27 has a lead directed along with the leads green, red and yellow of each motor to selector switches. The black leads of each motor are connected together and extend to ground.

Also at the bottom of Board 1 (Fig. 8) is power switch 30, a toggle switch 31, two push button switches 32 and 34 and two lamps 16 and 17 associated with the respective switches 32 and 34.

Row and bank selector switches

Figure 4:
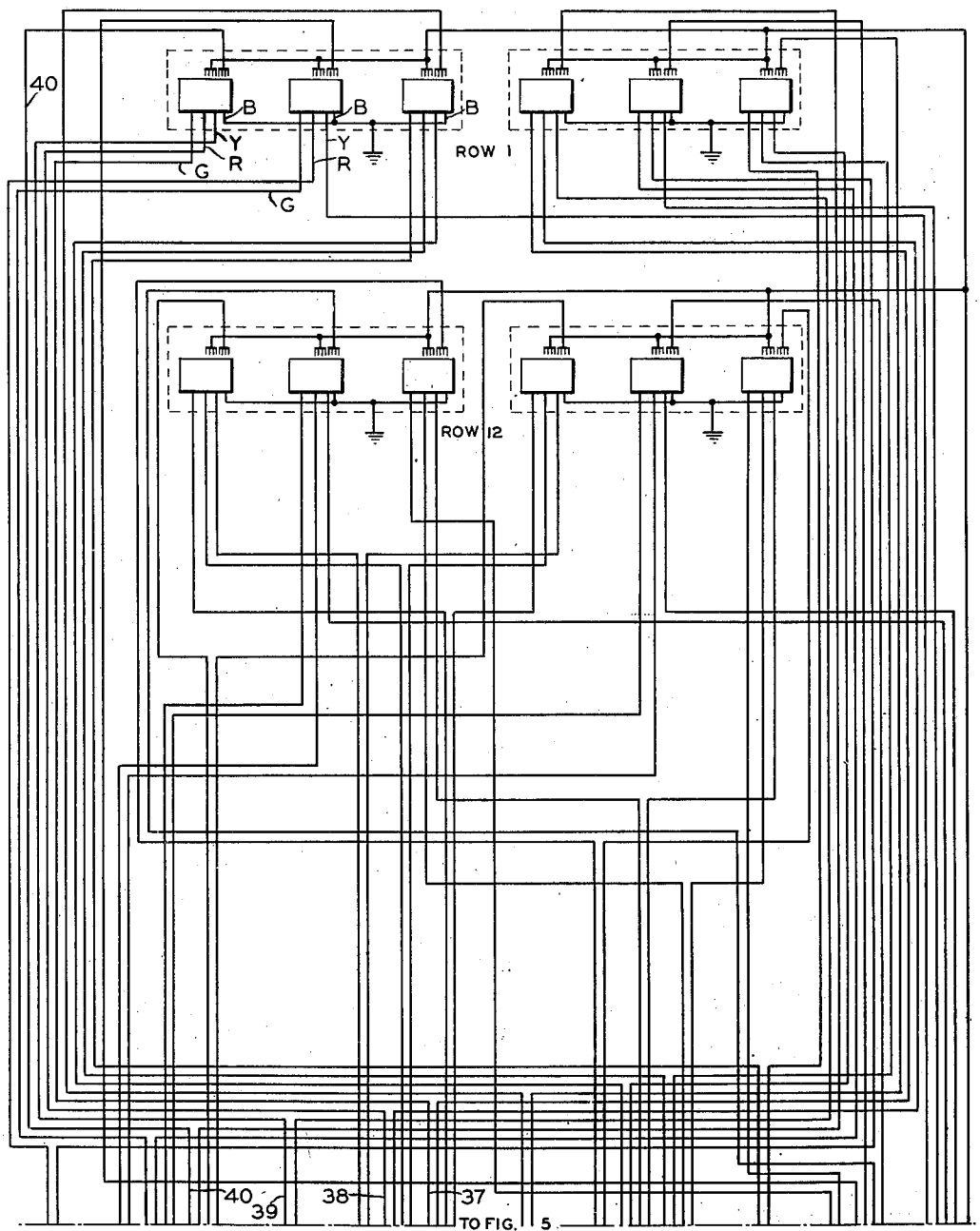
Figure 5:
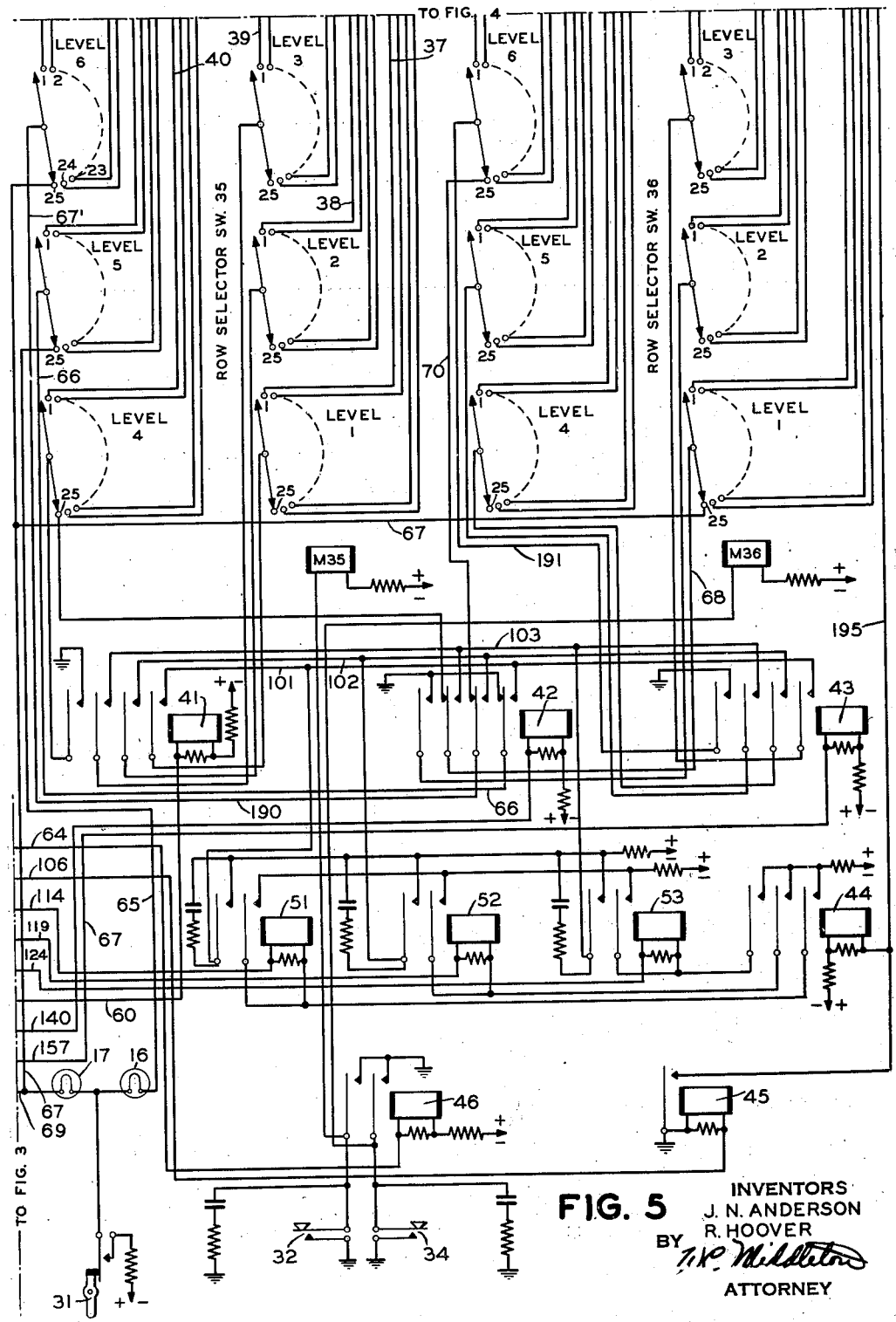

Located within a compartment labeled "Rotary switch compartment" behind board 1 is a pair of row and bank selector switches 35 and 36 (Fig. 5). Each switch has six levels with the wipers of each level mounted on a common shaft and moving in unison so that in effect the six levels constitute a single switch. For purposes of economy of space, the six levels of the two switches have been shown in Fig. 5 as being in pairs of three levels with single magnets or wiper actuators M35 and M36 supplied for the respective switches. Each level of each switch is provided with twenty-five contact points, it being understood that point 25 represents the home position for the wiper of each level. The two six-level switches are used to provide circuits for the six indicator motors in each row of a board. Similar points of the two switches provide twelve circuits to the three left hand motors in a row, while the next similar points of these twelve levels provide circuits to the three right hand motors of a row. The No. 1 points and No. 2 points are connected to the motors in row 1 with the No. 3 and No. 4 points connected to motors in row 2, and on through the series until points 23 and 24 of the twelve levels are connected to the six motors in row 12. In Fig. 4 the six motors representing row 1 have been shown near the top thereof, while the six motors in row 12 have been shown below the first group, it being understood that the motors of the intervening rows have been omitted along with their circuit connections to the various points of the twelve levels of the two row selector switches.

As an example of the connections just mentioned, it will be noted by reference to Figs. 4 and 5 that points 1 of levels 1, 2, 3 and 4 of selector switch 35 are connected to the left hand indicator motor of the left hand bank of row 1 by the conductors 37, 38, 39 and 40, respectively. In like manner contact points No. 1 of the fifth and sixth levels of selector switch 35 and contact points 1 of levels 1 and 2 of selector switch 36 are connected to the middle motor of the left hand bank of row 1. Similarly, contact points No. 1 of levels 3, 4, 5 and 6 of selector switch 36 are connected to the right hand motor of the left bank of row 1. In these figures contact points No. 2 of corresponding selector switches are connected to the three motors of the right hand bank in row 1, while contact points 23 are connected to the three motors in the left hand bank of row 12, and points 24 of the switches are connected to the three motors of the right hand bank in row 12. As before mentioned, the intervening rows of indicator motors have been omitted, and consequently the connections between them and the intervening contact points on the selector switches have likewise been omitted.

A number of relays are mounted in the relay compartment in Board 1, such relays being numbered 41, 42, 43, 44, 45, 46, 51, 52 and 53. The purpose of these relays and their operation in connection with other parts of the mechanism will be described in the explanation of the schematic circuit diagram hereinafter.

Group switch

The group switch shown on the panel in Fig. 7 has been illustrated diagrammatically in Fig. 3 of the drawings wherein it will be seen that this switch is a multi-section switch, being composed of six sections. Each section has three contact wipers or movable pointers, each of which is movable selectively over a set of three points. All of the wipers are mounted on a common shaft for movement in unison so that at any instant each pointer will be in engagement with a corresponding point in each set of each section. The contact points and pointers of the various sets are so wired in the circuits of this system that, when a movable pointer of one set is in engagement with the upper point of its set, that point is included in circuit for operation of all boards or, in other words, the upper point of each set corresponds to the No. 3 position of the group switch (Fig. 7), while the center point of each set corresponds to the No. 2 position of the group switch indicator, and the lower point of each set corresponds to the group 1 position of the indicator of the group switch.

Write-up and blank-out switch

Figure 2:
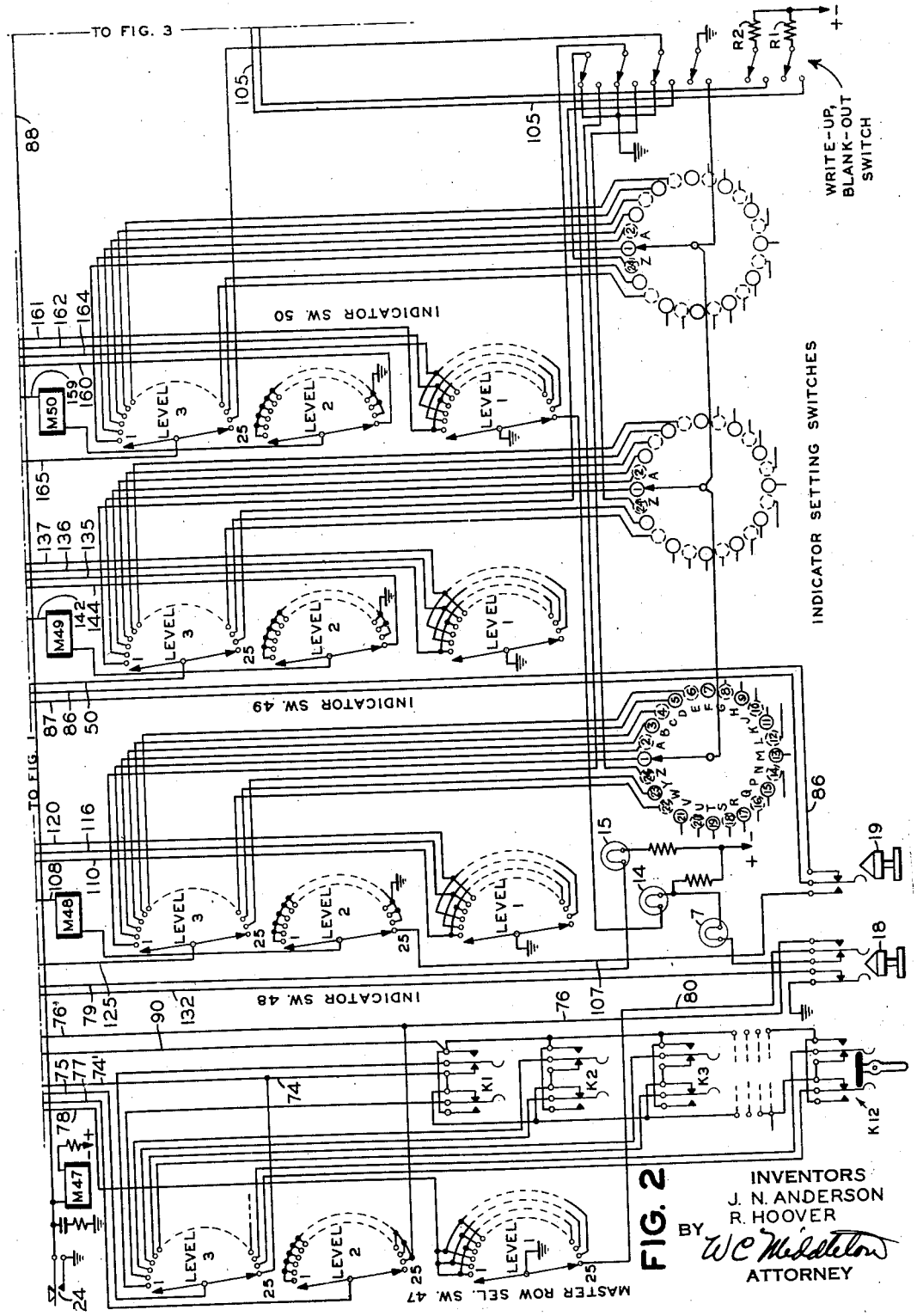

The write-up switch shown in Fig. 7 is constructed in the manner illustrated in Fig. 2 of the drawings wherein it will be seen that this switch has a number of pointers or wipers, all mounted on a common shaft for movement in unison to select individually either one of two contact points for completing or breaking desired circuits. When these pointers are moved to uppermost contact closing position, the switch is in the blank-out position, while the lowermost points represent the write-up position.

Associated with the panel of Fig. 7 is a master row and bank selector switch 47 (Fig. 2) and three indicator counting switches numbered respectively 48, 49 and 50. The four switches 47 to 50, inclusive, are of the twenty-five contact type with contact No. 25 in each case representing the home position of its respective switch.

An impulse unit 54 is provided for the mechanism, such unit being shown in Fig. 1 as being made up of two spaced disc-like members 55 and 56 eccentrically mounted on a shaft driven by a suitable motor (not shown). The two discs 55 and 56 have pairs of circuit closing contacts associated therewith so that each disc in the course of a complete revolution closes two pairs of contacts, one side of each pair leading to battery.

Conveniently located behind the panel of Fig. 7 is a group of relays numbered respectively 57, 58, 61, 62, 63, 71, 72, 73, 81, 82, 83, 91, 92 and 93. The function of these various relays will be described in the detailed description of the circuits employed in this indicating system.

In the circuit diagram of Figs. 1 to 5, inclusive, a plurality of sources of power have been shown at various points in the system for the purpose of eliminating conductors which would be necessary to connect these various points to a common source. These sources are indicated by the plus and minus signs which are used for the purpose of indicating that either side of the common source used in this system can be grounded with various circuits completed between the ungrounded side and ground. Likewise, ground points have been supplied at frequent intervals throughout the system.

Phasing or synchronizing selector switches

In the operation of this indicating system it is necessary to move each power switch 30 at each indicator board to closed position, thereby supplying power to the board, and this switch may be left closed during operation of the system. However, the main power switch (not shown) at the central panel should be switched on only immediately prior to a write-up or blank-out operation and switched off upon the completion of such operations. When service is initiated on the system, it is necessary as a preliminary step to ascertain whether all stepping switches of the system are synchronized or in phase or, in other words, whether every wiper of each switch is in contact with a similar point thereon. Inasmuch as the row and bank selector switches at the control panel and at the individual indicator boards are of the type which home on point 25, means are provided for readily determining whether this condition exists. When the main power switch is turned on at the board, one immediate result is the energization of relay 91 with a circuit extending from battery at that relay through conductor 59 to the second right break contact of relay 61 and thence to ground. Due to the energization of relay 91, a circuit is closed from ground at its second make contact through the third set of section 5 of the group switch, conductor 60, through relay 41 and to battery adjacent thereto, energizing relay 41. This circuit is established if the group switch is set at either position 1 or position 3, selecting all boards, or only group 1 boards. If the group switch is at position 2, then a relay corresponding to relay 41 will pick up at all group 2 boards.

Assuming that the group switch is in No. 3 position, all the phasing lamps 1 to 4, inclusive, of group 1 indicator boards and lamps 8 to 13, inclusive, of group 2 indicator board should be illuminated if the row and bank selector switches of all of the boards are on home position. Should any phasing lamp be dark, such condition indicates that the row and bank selector switch or switches of that board are out of phase and must be adjusted manually.

Should the master row and bank selector switch 47 be at any position other than home, the lamp 7 on the control panel will be dark, indicating that manual adjustment of this switch is necessary. Switch 47 can be stepped consecutively by repeated manual closure of push button switch 24 which completes a circuit from battery to ground through the switch magnet M47, as shown in Fig. 2. Repeated closings of this push button switch can be carried out until the lamp 7 is illuminated, indicating that switch 47 is in proper home position. The energizing circuit for lamp 7 is from ground on the wiper of level 1 of switch 47 to point 25 of this level, through the right hand break contact of push button switch 18, and then through lamp 7 to battery adjacent thereto.

Should all of the lamps of either group be dark (indicating that all board selector switches are not at home position), the row and bank selector switches of that group can be manually stepped in unison until the home position is reached, through the agency of the toggle switch 20 and push buttons 21 and 22. Should it be desired to advance the pairs of selector switches 35 and 36 of each board in group 1, toggle switch 20 can be thrown to the left, moving the right hand tongue from its break contact to its make contact. When push button 21 is depressed, a circuit is closed from ground through the contacts of switch 21, through the right hand make contact of switch 20, along line 64, through relay 46 to battery adjacent thereto. The closing of the two contacts of relay 46 automatically closes circuits between ground on the make contacts of this relay, through two switch magnets M35 and M36 to battery adjacent each thereof, thereby stepping the switches 35 and 36 one point. Establishment of these circuits can be repeated (by use of push button 21) until the switches 35 and 36 reach home position, which will be indicated on the control panel by illumination of phasing lamp 1, if the two switches 35 and 36 are properly synchronized, or in phase with each other. Inasmuch as the pairs of switches of each board of group 1 are controlled simultaneously by actuation of the push button 21, at some time one of the lamps 1 to 4, inclusive, will be illuminated when a pair of switches at any one of the boards reaches home simultaneously. If other lamps are dark at the time, this condition indicates that the remaining boards of that group must be brought into phase.

Should the switches 35 and 36 at a board be out of phase with respect to each other, as indicated by darkened lamp, they may be brought into phase in the following manner. Switch 31 is moved to close its contacts, thereby making possible circuits through lamps 16 and 17, which circuits will be completed when the two switches are simultaneously at home position. The proper procedure for phasing these two switches is to step switch 35 around until lamp 16 is energized, such stepping being accomplished by repetitious actuation of push button 32 which closes a circuit from ground through magnet M35 to battery adjacent thereto. When this switch is on home position, a circuit is established from battery at switch 31, through lamp 16, line 65, to point 25 of level 5 of switch 35, from the wiper of level 5 to line 66, to the first tongue of relay 42, and thence through the first break contact of this relay to ground.

With selector switch 35 on home position, switch 36 can be stepped around until it likewise is at home position by repetitious actuation of push button 34, closing a circuit from ground through magnet M36 to battery adjacent thereto. As soon as the wipers of the six levels of switch 36 reach home position, a circuit will be closed between battery at switch 31, through lamp 17, line 67, to point 25 of level 1, switch 36, from the wiper of this level through line 68, to the third break contact of relay 42, thence to point 25 of level 4 of switch 35, and to ground through the fourth make contact of relay 41, which relay was automatically energized upon the closing of the main power switch, as before described. It will be noted that this circuit can be closed only when both switches 35 and 36 are at home, and consequently care must be taken to home switch 35 before attempting to home switch 36. When light 17 indicates that switch 36 is properly homed along with switch 35, lamp 1 on the control panel will be illuminated, since this lamp is in parallel to lamp 17, and its circuit extends from battery adjacent lamp 1 through line 69 to its junction with line 67 and thence as before traced. An alternative circuit through lamp 17 can be closed under certain conditions, such circuit extending from battery at switch 31, through lamp 17, line 67, line 67', to point 25 of level 6 of switch 35, from the wiper of this level to the second break contact on relay 42, line 70, to point 25 on level 6 of switch 36, from the wiper of this level to the fourth tongue on relay 43, and then to ground on the fourth make contact of this relay, if that relay is energized. Energization of this relay will occur near the end of a complete sequence of operation of the system in a manner to be described later.

After each set of board selector switches of group 1 has been synchronized or phased so that lamps 1 to 4, inclusive, are illuminated, then all sets of selector switches of the boards of group 2 can be phased in the same manner, recourse being had to switch 20 and push button 22 for stepping all of the selector switches in unison, and, if necessary, individual push buttons on the respective boards being used for phasing each pair of switches. When the toggle switch 20 is moved to the right, the normal circuit is interrupted and a secondary circuit for group 2 is established between ground at push button 22 (when this button is depressed) to the selector switch relays of board 2, corresponding to relay 46. After all of the selector switches of board 2 have been properly synchronized or phased, switch 20 is restored to its normal position, shown in Fig. 3, and the entire system is then in condition for the posting of such indications as may be desired. Once all of the switches have been properly synchronized or phased, they will remain in that condition during normal operation of the system, being thrown out only by unusual power failure, switch failure, or other abnormal conditions.

Group selecting

In the process of posting, a supervisor or other attendant at the control panel will first determine the boards of the group to be posted, i. e., either group 1, 2, or both groups, and adjust the group switch with the pointer indicating the desired group. For example, if all boards are to be posted, then the group switch will be adjusted to the position shown in Fig. 3 wherein each pointer makes contact with the upper or right hand point of its set. If the boards to be posted are only those of group 2, then adjustment of the switch will cause all pointers to be in contact with the center point of their respective sets. Likewise, posting of only the boards in group 1 requires adjustment of the group switch so that all pointers therein are in contact with the lowermost or left hand point of each set. Inasmuch as only board 1 has been shown in the drawing, it will be assumed that group 1 is the group to be posted, and consequently the group switch (Fig. 3) will be adjusted in the manner last described in connection therewith.

Row and bank selecting

The operator or supervisor must next determine the row of the particular boards to be posted and, when such determination has been made, the first step is to adjust the proper key switch of Fig. 7 by moving the handle of the same to the left, which also selects the left bank of that row. These switches are shown diagrammatically in Fig. 2 of the drawings wherein switches K1 to K3, inclusive, have been shown and also switch K12, the latter switch being indicated as being of three-position key type, which is the case in the other switches. The key switches are associated with master selector switch 47, as shown in Fig. 2, wherein it will be seen that point 1 of level 3 of switch 47 is connected to the right hand spring tongue of switch K1; point 2 is connected to the left hand spring tongue of the same switch K1; point 3 to the right hand spring tongue of switch K2; point 4 to the left hand spring tongue of the same switch, and on through the series until point 23 is connected to the right hand spring tongue of switch K12 and point 24 to the left hand spring tongue of the same switch. Point 25 of level 3 is connected to the right hand break contact of switch K1 by the line 74 and also to the winding of relay 58 by line 74'. The wiper of level 3 is connected by line 75 to the third tongue of relay 57.

Points 1 to 24, inclusive, of level 2 of switch 47 are strapped together and are connected to line 76 which extends to the right hand make contact of switch 18, and are connected to line 76' which extends to the common point of the windings of relay 57. The wiper of level 2 is connected by line 77 to the second left hand make contact of relay 63. Point 25 of this level is blank.

Points 1 to 24, inclusive, of level 1 of switch 47 are strapped together, as shown in Fig. 2, and these strapped points are connected by line 78 to the first tongue of relay 57. The first break contact of this relay in turn is connected by line 79 to the lamp 15. The wiper on level 1 is grounded. Point 25 of level 1 is connected by line 80 to the right hand spring tongue of switch 18, causing lamp 7 to be illuminated when the wiper of level 1 is at home position and switch 18 is in normal position, as shown in Fig. 2.

After the operator has selected the desired row to be posted and has moved the key switch of that row to left hand position (selecting the left bank of that row), the master selector switch 47 can be energized to start stepping, and as a result of such energization relays 46 of the group to be posted will move in step therewith. Assuming, for purposes of illustration, that row 3 of group 1 is to be posted, the key switch K3 will be moved to the left, forcing the right hand spring tongue of switch K3 into contact with the right hand make contact of this switch. The setting of switch K3 in this position will result in master switch 47 being brought to stop when the wiper of level 3 has been brought into contact with point 5 thereon. Inasmuch as the switches K1 to K12 are connected respectively to successive odd and even points of level 3 of switch 47, it follows that with the selector switches in each indicating board being similarly connected to the motors of the banks of each row the proper bank of the proper row can be selected.

The rotary switch 47 can be prepared for rotation by pushing the button 18, which moves both spring fingers outward, causing the right spring finger to engage the right make contact of that switch. Such engagement establishes a circuit between ground on the wiper of level 1 of switch 47 through contact 25 of that row, through the right hand spring tongue of switch 18, line 76, line 76', to the common point of the two windings of relay 57, and to battery through the right winding of relay 57. These windings are of differential nature, with the right hand winding being connected directly to battery adjacent thereto. This same ground can be applied to a circuit through the left hand winding of relay 57, if the upper right contact of the impulse unit is closed, supplying battery therethrough and through the line 84 to the break contact of make-before-break assembly of relay 57, and thence through line 85 to the left hand winding of this relay. If the upper right contact of the impulse unit is closed at the instant the button 18 is pushed, establishing ground at the common point of these two windings, circuits are completed through both coils, and since these coils are differentially wound relay 57 will not be operated until the upper right contact of the impulse unit opens. The purpose of this arrangement is to prevent a split impulse becoming effective on the stepping circuit which will be described below. As soon as the upper right contact of the impulse unit opens, relay 57 will operate, since energy will be removed from the left hand winding, and the circuit has already been completed through the right hand winding. When this relay operates, it locks itself in operated condition by a locking circuit extending from battery through the right winding to the common point of both coils, through its own second make contact through line 86, the break contact of pushbutton 19, line 87, to ground on the third right hand break contact of relay 61.

Operation of relay 57 disconnects the left hand opposing coil from the source of impulses by the breaking of the make-before-break assembly fed by line 84 from the upper right contact of the impulse unit. The supply line 84 is then connected through the third make contact of relay 57, line 75, to the wiper of level 3 of switch 47, through point 25 of that level, line 74', to ground through relay 58. Consequently, after relay 57 has operated by the opening of the upper right contact of the impulse unit, the next closing of such contact will cause operation of relay 58 through the circuit just described. Operation of relay 58, in picking up, closes a circuit from battery adjacent the magnet M47 of switch 47, through line 88 to ground on the first make contact of relay 58. Simultaneously a circuit is completed from battery adjacent relay 46 (Fig. 5) through this relay, line 64, right hand spring tongue of switch 20, break contact thereof, through the middle pointer of section 1 of the group switch, line 89, to ground on the second make contact of relay 58. Energization of magnet M47 and relay 46 causes respectively stepping of switch 47 to point 1 thereof and operation of magnets M35 and M36 of switches 35 and 36 to step the wipers of these two switches likewise to point 1. Thus, it will be seen that the master row selector switch 47 and the board row selector switches 35 and 36 step in unison.

When the next impulse is supplied by the upper right contact of the impulse unit, switches 47, 35 and 36 will again step another point, if switch K1 is in normal position, since the impulse circuit can be traced from battery at the impulse unit through line 84, line 75, to the wiper of level 3 of switch 47, point 1 of this switch, to the right spring tongue of switch K1, line 74, line 74', and to ground through relay 58. Similarly, the switches will be stepped in unison from point 2 to point 3, if switch K1 is in normal position, since the circuit just traced will differ only in its connection from point 2 to the left hand tongue of switch K1. It will be noted in Fig. 2 that similar make and break contacts on all of the key switches K1 to K12 are strapped together, with the only individual lines on these switches extending from the points on level 3 to the tongues of the various key switches. Thus, stepping of the selector switches in unison will continue until the wiper of level 3 reaches a point thereon connected to a tongue of a key switch which has been moved from normal position. Under the assumption previously made that key switch K3 had been moved to the left, forcing its right spring tongue against its outer make contact, stepping of these selector switches in unison will continue until the wiper of level 3 of switch 47 reaches point 5. When this condition prevails, the circuit from battery through the upper right contact of impulse unit 54 will extend through line 84, line 75, wiper of level 3 of switch 47, point 5, to the right spring tongue of switch K3, line 90, to the fourth right hand break contact of relay 63, line 94, to line 85, through the left hand winding of relay 57 to ground, through the second make contact of relay 57, line 86, break contact of push button 19, line 87, to the third right hand break contact of relay 61. Energization of the left hand coil of relay 57 neutralizes the activation of the right hand coil thereof, causing this relay to fall back and removing the impulse circuit from relay 58.

Relay 58 having been deprived of energization from the impulse unit, all of the selector switches are left in position corresponding to the key switch manipulated, and thereby the selection of the row and bank to be written up is completed. The bank in a row is determined by the position of the key switch. Thus, if such switch has been moved to the left, the left hand bank of a row has been selected, while if the key switch was initially moved to the right, the right hand bank of the same row has been selected.

When the push button 18 was first moved to initiate the selection of the bank and row, the circuit energizing lamp 7 was broken by movement of the right hand spring tongue of switch 18 from the break contact. Once the master selector switch 47 has begun stepping, button 18 may be released, but lamp 7 will not be reenergized, since the wiper of level 1 of switch 47 has moved away from point 25, depriving lamp 7 of current of its battery connection.

In addition to the locking circuit for maintaining relay 57 operated in the manner previously described, a second locking circuit is provided for this relay, such circuit extending from battery through the right hand coil of the relay to the first make contact thereof, and thence through line 78 to the strapped points of level 1 of switch 47, and thence to ground from the wiper thereof. This second locking circuit will also be opened by relay 57 falling back so that the relay will remain unoperated until further steps in a cycle of operation are completed. When the first tongue of relay 57 restores its contact with the first break contact thereof, ground is placed on the lamp 15 from the grounded wiper of level 1, the point of level 1 on which the wiper rests, through line 78, the first break contact of relay 57, line 79 to lamp 15 and thence to battery. Lamp 15 indicates to the operator or supervisor that the desired bank and row has been selected and that further operation of the system is in order. This lamp 15 can be energized only when the wiper of level 1 of switch 47 has settled on one of its strapped points 1 to 24, inclusive, while relay 57 is unoperated, such condition being one which can exist only when a bank of indicating motors in a particular row has been selected.

*Posting indicators of a bank*

During the operation of the row selector switches in selecting the proper bank and row as previously described the operator or supervisor may set the three indicator setting switches to such combination of letters as may be desired to be posted in the particular bank. For example, if conditions required the posting of the three letters C, N and D in the selected bank, the first or left hand setting switch would be moved so that its pointer contacted position 4 or C thereon, the second or middle setting switch would be moved to contact the point marked N thereon, and the third or right hand setting switch would be moved to cause its pointer to contact the letter D. The write-up switch would then be moved to the left (Fig. 7), which movement would cause all of the pointers of this switch to contact their respective lower or left hand points, as indicated by the alternative situation in Fig. 2. Inasmuch as the operation of the individual indicator motors has been described previously, it is apparent that impulses applied to three of the leads to each motor must be furnished in sequence to cause the selected motors to step around until the desired letters of the alphabet appear in the windows associated with these motors. The mechanism utilized for accomplishing this result comprises the three indicator counting switches 48, 49 and 50, the relays 71, 72 and 73, acting in cooperation with relays 81, 82 and 83, and also in cooperation with relays 61, 62 and 63. Likewise, relay 91 which was energized when power was initially turned on to the system cooperates in selecting one relay 41 at the board for stepping the first motor of the selected bank, while relay 92 will control relay 42 for the energization of the second motor, and relay 93 will control the energization of relay 43 for activating the third motor. Intermittent impulses are supplied to these motors by relays 51, 52, 53 under the control of a relay 54, in turn controlled by relay 45.

By reference to Fig. 5 it will be seen that the wipers of rows 1, 2 and 3 of selector switch 35 are connected respectively to the first, second and third tongues of relay 41, while the wiper of level 4 of this switch is connected to the fourth tongue of the same relay. Similarly, the wipers of levels 5 and 6 of switch 35 and levels 1 and 2 of switch 36 are connected respectively to the first, second, third and fourth tongues of relay 42. Finally, the wipers of levels 3, 4, and 6 of switch 36 are connected respectively to the first, second, third and fourth tongues of relay 43. The first make contacts of the relays 41, 42 and 43 are connected in multiple to the line 101; the second make contacts of the three relays are connected to a line 102, and the third make contacts of the same relays are connected to a line 103. The fourth make contact of each of these relays is grounded. The second tongue of relay 51 is connected to the line 101; the second tongue of relay 52 is connected to the line 102, and the second tongue of relay 53 is connected to the line 103. It follows that pulses applied under the control of the three relays 51, 52 and 53 will be transmitted to the three indicator motors under the control of the relays 41, 42 and 43 or, in other words, pulses will be transmitted to the first motor of the left bank when relay 41 only is operated; to the second motor when relay 42 only is operated, and to the third motor when relay 43 only is operated.

When the write-up switch is moved to write-up position, a circuit is closed from battery through the resistance R1, line 105, through the pointer of the midset of section 6 of the group switch, line 106, through relay 45 to ground, causing this relay to be operated. Operation of relay 45 establishes a circuit between battery at relay 44 and ground on the tongue of relay 45, operating relay 44. The operation of the latter relay makes battery available to relays 51, 52 and 53 through the respective three make contacts of relay 44.

With the system in preparedness for posting the indicator drums of the selected bank, such posting can be initiated by operation of the button 19. While in the description of the operation of the master selector switch 47 and board selector switches 35 and 36 the assumption was made that key K3 was operated to select the left bank of row 3, for purposes of describing the operation of the indicator switches and the pulsing magnets it now should be assumed that the left bank of row 1 has been selected so that the circuits shown in Fig. 5 can be traced. As pointed out previously, the operation of the master row selector switch and the board selector switches is the same for any position of any of the selector keys K1 to K12, inclusive, so that the assumption just made does not interfere with the orderly presentation of the following operation.

Movement of the switch 19 to force its spring tongue into connection with the make contact of the switch completes a circuit from ground at the third right break contact of relay 61, through line 87 to the tongue of switch 19, from the make contact through line 107 to point 25 of level 2 of indicator counting switch 48, from the wiper of this level through the switch magnet M48, line 108, through the break contact of relay 71 and line 109 to the upper left contact of impulse unit 54, and thence to battery when this contact is closed. The first closure of this upper left contact of the impulse unit while switch 19 is moved inwardly will cause current to flow through the above circuit, energizing the operating magnet so that the rotary switch will step one point from its normal home position to point 1 on each of the three levels. As soon as the wiper of level 2 of this switch reaches point 1, the stepping circuit just described is grounded at this level and will remain grounded throughout stepping of the switch to point 24, since points 1 to 24 are strapped together and grounded. For this reason the switch 19 can be released once the switch magnet M48 has made the first step of switch movement, in effect shunting out the circuit which was established through this switch and through the third right break contact of relay 61. Due to the grounding of the supply circuit through magnet M48 at level 2, switch 48 will step each time the upper left contact of the impulse unit closes and opens.

When the wiper of level 1 of switch 48 reaches point 1, ground is applied from this wiper through point 1, line 110, first left break contact of relay 61, line 111, through relay 81 to battery, causing this relay to be operated. When relay 81 picks up, ground is applied to a circuit extending from the first make contact thereof through line 112, lower pointer of section 3 of the group switch, line 114, through relay 51 to battery at the first make contact of relay 44. Since, as pointed out earlier, relay 91 was operated when power was turned on to the system and, as a consequence, relay 41 had operated, it follows that relay 51 in operating applies battery through the second make contact thereof to the line 101. From this multiple line 101 the only circuit which can be completed is through the first make contact of relay 41 to the wiper of level 1 of row selector switch 35. Since under the assumption now existing this switch is at rest with its wiper on point 1, the circuit is continued from the wiper through point 1, line 37, to the green, or G, lead line, to the first motor of the left bank of row 1, and thence to ground through the black, or B, lead. As pointed out in connection with the detailed description of the indicator motor, an impulse fed to poles A through the green, or G, line will cause no movement of the rotor of the magnet if the drum is at the blank position, and this condition prevails if the system was in normal operating condition at the beginning of manipulation. Consequently, the first pulsation applied to the first motor does not cause movement of the rotor thereof, and the indicator drum remains at the blank position.

When the wiper of level 1 of switch 48 moves to point 2, ground is applied to a circuit extending from the wiper through point 2, line 116, to the second left break contact of relay 61, line 117, through relay 82 to battery, causing this relay to be operated. Such operation completes a circuit from ground on the first make contact thereof through line 118, pointer of the midset of section 3 of the group switch, line 119, through relay 52 to battery on the second make contact of relay 44, thereby operating relay 52. When this relay is operated, a circuit is completed from battery applied to the second tongue thereof through the second make contact of the relay to multiple 102, and since relay 41 is the only relay operated of the group 41 to 43, inclusive, this circuit continues from the second make contact of relay 41 to the wiper of level 2 of switch 35, then from point 1 of this switch to the line 38, to the red, or R, lead of the first motor of the left bank of row 1, thereby applying the second sequential pulse to this motor and causing it to advance 15°, bringing letter A on the alphabet drum into register with the window in the indicator board.

When the wiper of level 1 of switch 48 reaches point 3, ground is applied to a circuit which extends from this wiper, through line 120, the third left break contact of relay 61, line 121, through relay 83 to battery, operating this relay. When this relay picks up, ground is applied from the first make contact thereof through line 122, the first, or top, pointer of section 3 of the group switch, line 124, through relay 53 to battery on the third make contact of relay 44. Closure of this circuit operates relay 53 and establishes a circuit from battery through the second make contact thereof to multiple line 103, and from this line through the third make contact of relay 41 to the wiper of the third level of switch 35, thence from point 1 of this level through 39 to the yellow, or Y, lead of the first indicator motor. This circuit advances the motor another 15°, bringing the letter B on the indicator drum into register with the window in the board.

It should be noted that successive fourth points on level 1 of switch 48 are strapped together so that, when the wiper of these levels reaches point 4, the same circuit is established as was set up when the wiper was at level 1, and also the same circuit prevails for points 2 and 5 and the same circuit for points 3 and 6 and on around the switch. Consequently, as this wiper progresses from point to point in its path of travel around the switch, successive impulses will be applied to the first indicator motor by the respective pulsing magnets 51, 52 and 53, each pulse advancing the motor 15°. Repetitious closing of these three circuits at the level 1 is carried out until the wiper of level 3 comes to rest on the point thereof connected to the selected point on the first indicator setting switch.

Under the conditions assumed the desired setting of the first motor was the letter C, and consequently, when the wiper of level 3 reaches the fourth point thereon connected to letter C of the first indicator setting switch, a circuit is completed from ground, common to the pointers of all three switches and established by the write-up switch, through the wiper of level 3, line 125, left hand coil of relay 71 to battery at the first right break contact of relay 61. The establishment of this circuit causes relay 71 to operate, breaking the battery supply circuit from the upper left contacts of the impulse unit through the break contact of this relay to the magnet M48, thereby depriving this magnet of rotary switch 48 of the next impulse supplied by the impulse unit. Consequently, switch 48 will remain with all its wipers on point 4, and relay 51 will be the last of the three pulse relays to operate. This last operation of relay 51 advanced the first indicator drum a third 15° of movement, exposing the letter C in the board window. The indicator motor and, consequently, indicator will remain stationary because of the slight frictional load of the rotor of the motor, keeping the letter C exposed until the motor is moved by the application of other impulses.

The next impulse from the upper left contacts of the impulse motor, instead of being applied to the magnet M48, will be applied through line 109 and the make contact of relay 71 to the right hand winding of relay 71, the circuit being completed through line 130, through relay 61, line 131, line 132 to ground on the left break contact of switch 18. The completion of the circuit provided by this impulse, in addition to energizing the second winding of relay 71 (the second winding being in a direction aiding the first winding), causes relay 61 to operate, and relay 61 will lock itself in operated condition by battery supplied by its first right hand make contact, the circuit being completed through the same path as that utilized by the impulse from the impulse unit. Since this source of battery was first applied through the first break contact of relay 61 to operate relay 71, it follows that operation of relay 61 deprives the left hand winding of relay 71 of a source of energy so that this relay 71 drops back when the upper left contacts of the impulse unit are opened. The circuit utilized in operating relay 61 is completed through the second coil of relay 71 in order that this relay may be held in operated condition for the complete duration of the impulse supplied by the impulse unit, even though relay 61 in picking up deprives relay 71 of its original operating current.

Operation of relay 61 disconnects the windings of relays 81, 82 and 83 from the strapped points of level 1 of switch 48 by the breaking of the three left hand break contacts of relay 61. Operation of relay 61 also breaks the circuit through which relay 91 was originally energized by the opening of the second right break contact. When relay 91 falls back, it causes the deenergization of relay 41 with the result that the motor of the first indicator is now completely disconnected from further pulsing by relays 51, 52 and 53, and therefore the first indicator motor and its drum will remain in the position to which it was last moved, namely, the selected letter C.

When the relay 71 falls back, restoring its break contact, the stepping circuit for the first counting switch is restored from the upper left contacts of the impulse unit through the break contact of relay 71, through switch magnet M48 and to ground on the wiper of level 2. The switch then will continue stepping until it reaches point 25, at which point it loses ground on level 2. Having reached point 25 or home position of this switch, it will remain there until the next manipulation of the push button switch 19. The circuits associated with levels 1 and 3 of switch 48 have been rendered ineffective during the homing action due to the operation of switch 61, the results of which were described just previously.

When relay 61 operates, disconnecting the coils of relays 81, 82 and 83 from the strapped points of the first level of switch 48, these relays are in effect transferred through the three left make contacts of relay 61 to the three left tongues of relay 62. Since relay 62 has not been energized, the three left break contacts are closed and are connected by lines 135, 136 and 137 to points 1, 2 and 3, respectively, of level 1 of indicator counting switch 49. The points of level 1 of this switch 49 are strapped together in the same manner as those of level 1 of switch 48.

At the same time the energizing circuit of relay 91 was broken by operation of relay 61 a circuit for the energization of relay 92 was established. This circuit can be traced from battery at relay 92 through line 138, second right break contact of relay 62, thence to second right make contact of relay 61, and to ground. When relay 92 picks up, it closes a circuit from ground extending through its second make contact, line 139, to the middle pointer of section 5 of the group switch, line 140, through relay 42 to battery, causing this relay to pick up. Due to the operation of relay 42, it follows that any pulses which may be supplied by the relays 51, 52 and 53 will be passed along from the multiple lines 101, 102 and 103 to the wipers of the levels 5 and 6 of switch 35 and level 1 of switch 36. Since these two switches are still at rest with their pointers on point 1, such pulses supplied by the pulsing relays will be transmitted to the second motor of the left bank of row 1 in the same manner that pulses were transmitted to the first motor of this bank.

Operation of relay 61 also completes the starting circuit for causing the second indicator counting switch 49 to step. The stepping circuit for switch 49 extends from battery supplied by the lower right contacts of the impulse unit through line 141, through the break contact of relay 72, line 142, magnet M49 for the switch 49, wiper of level 2 of switch 49, to point 25 on level 2, and thence by line 144 through the third right break contact of relay 62 to the third right make contact of relay 61 to the ground. Consequently, the next closure of the impulse unit, i. e., closure of lower right contacts of the unit, will cause the magnet M49 to be energized and step switch 49 to point 1 where relay 81 will be operated by reason of the circuit established from ground at the wiper of level 1 and extending through line 135 to relay 81, as previously described. Operation of relay 81 in turn causes operation of relay 51 which applies an impulse to the green, or G, lead of the second motor in the left hand bank.

When the wiper of level 1 of switch 49 moves to point 2, a circuit from ground is established through line 136 and the transfer contacts of relays 61 and 62 to the relay 82, operating it and consequently causing energization of relay 52 to apply an impulse to the red, or R, lead of the second indicator motor.

Similarly, movement of the wiper of level 1 of switch 49 to point 3 completes a circuit from ground through line 137, transfer contacts of relays 61 and 62, to line 121 and thence to relay 83, energizing the same. This last energization in turn causes operation of relay 53, which supplies an impulse to the yellow, or Y, lead of the second motor of the left bank.

When the switch 49 steps to the point 1 position, the stepping circuit through switch magnet M49 is grounded on the strapped points of level 2 so that the switch will continue to step as previously described until the wiper of the third level thereof finds a point connected to ground by the middle indicator setting dial. As the switch steps, relays 81, 82 and 83 operate in sequence, causing impulses to be applied to the middle indicator motor by the relays 51, 52 and 53 to step this indicator motor to the selected letter. When the switch finds the selected letter (in this case the letter N), a circuit will be completed from ground at the pointer of the second indicator dial, letter N thereon, through the N contact or No. 14 on level 3 of switch 49, from the wiper thereof through line 150, through the left coil of relay 72, line 151, the first right break contact of relay 62 to battery, causing the relay 72 to operate and break the magnet operating circuit for switch 49, which extends from the lower right contacts of the impulse unit through the break contact of relay 72. Operation of relay 72 also transfers the previous counting switch actuating circuit from the lower right contact of the impulse unit through line 141, to the make contact of relay 72, into the right coil thereof, and thence through line 152, through relay 62, line 131, line 132, to ground at the left break contact of switch 18. The completion of this circuit causes relay 62 to operate and to lock itself in place by the application of battery through the first right make contact and to ground as just described. The breaking of the first right break contact of relay 62 (when this relay picks up) deprives the left coil of relay 72 of battery so that, when the lower right contacts of the impulse unit open, removing energization from the right coil of relay 72, this relay falls back, restoring the stepping circuit to the switch magnet M49, causing counting switch 49 to resume stepping until the wipers thereof reach home position, at which point ground will be removed from the stepping circuit on level 2.

When relay 62 operated, breaking of the three left break contacts thereof disconnected the circuits leading to relays 81, 82 and 83 from the lines 135, 136 and 137 extending to level 1 of switch 49. Closing of the left hand make contacts of relay 62 in turn transfers the actuating circuits of relays 81, 82 and 83 to the three right break contacts of relay 63, and thence to level 1 of indicator counting switch 50. Operation of relay 62 also interrupts the energizing circuit of relay 92, the falling back of which deenergizes relay 42, interrupting the indicator motor circuits of the second motor with the result that this second motor remains in position with the letter N on its drum exposed at its window in the indicator board. Simultaneously a circuit is established from battery at relay 93, through line 155, second right make contact of relay 62, second right make contact of relay 61 to ground, energizing relay 93 which in turn operates relay 43. The circuit for operating relay 43 extends from ground through the second make contact of relay 93, line 156, through the pointer of the upper or right set of section 5 of the group switch, line 157 to battery at relay 43. Operation of relay 43 places the multiple lines 101, 102, and 103 in circuit with the green, red and yellow leads of the third motor of the left bank of row 1 so that impulses along these multiples will be applied to this indicator motor.

Operation of relay 62 also closed the stepping circuit for counting switch 50, such circuit extending from battery through the lower left contacts of the impulse unit, line 158, break contact of relay 73, line 159, motor magnet M50, wiper of level 2 of switch 50 to point 25 of this level, line 160 to second left break contact of relay 63, third right make contact of relay 62, third right make contact of relay 61 to ground. Consequently, when the lower left contacts of the impulse unit are closed, switch 50 steps from point 25 to point 1, at which time the stepping circuit, instead of extending from point 25 of level 2 as just described, is grounded on the strapped points of level 2.

When the wiper of level 1 of switch 50 reaches point 1, a circuit is closed from battery at relay 81, through line 111, first left make contact of relay 61, first left make contact of relay 62, first right break contact of relay 63, line 161, to point 1 of level 1 and to ground on the wiper thereof, operating relay 81. Operation of relay 81 causes operation of relay 51 in the manner before described with the result that an impulse is applied to the multiple line 101, and from this line through the first make contact of relay 43, to the wiper of level 3 of switch 36, which wiper is at rest on point 1, and thence to the green, or G, lead of the third motor of the bank being posted and to ground therethrough.

When the wiper of level 1 of switch 50 reaches point 2, a circuit is closed from battery at relay 82, through line 117, second left make contact of relay 61, second left make contact of relay 62, second right break contact of relay 63, line 162, to point 2 of level 1 of switch 50, and to ground from the wiper thereof, causing relay 82 to operate, which operation in turn causes energization of relay 52, applying an impulse through multiple 102 and the second make contact of relay 43 to the wiper of the fourth level of switch 36, and from point 1 on this level to the red, or R, lead of the third motor being posted and to ground therethrough.

When the wiper of level 1 of switch 50 rests on point 3, a circuit is closed from battery at relay 83, through line 121, third left make contact of relay 61, third left make contact of relay 62, third right break contact of relay 63, line 164, point 3 of level 1 of switch 50 to ground at the wiper thereof. Closure of this circuit operates relay 83, which in turn causes operation of relay 53, thereby applying an impulse through multiple 103, third make contact of relay 43, wiper of level 5 of switch 36, point 1 of this level, and to the yellow, or Y, lead of the third indicator motor being posted and to ground therethrough.

Application of impulses by the three relays 51, 52 and 53 in sequence to the third motor being posted causes progressive rotation of this motor in steps of 15° each in the manner previously described, and such pulsation of the motor continues until ground is applied at the indicator dial to the selected point on level 3 of switch 50. Under the assumption previously made this point is the letter D so that, when the wiper of level 3 of switch 50 rests on point 5, a circuit is closed from ground at the indicator dial through point 5 or letter D on this dial, point 5 on level 3, wiper of level 3, line 165, through the left winding of coil 73, to battery at the first left break contact of relay 63, causing operation of relay 73. Operation of relay 73 breaks the impulse circuit to motor magnet M50 (which extended through the break contact of relay 73) and instead continues a circuit through line 158 from battery at the lower left contacts of the impulse unit through the right winding of relay 73, line 166, through relay 63, line 131, line 132, to ground at the left break contact of push button switch 18, causing operation of relay 63 when an impulse is supplied by the impulse unit, which relay in turn locks itself in operated position by a circuit from battery at the relay through the first left make contact of the relay to ground by lines 131 and 132. In so locking itself in operated position, the first left break contact of relay 63 is opened, depriving the left winding of coil 73 of battery so that, when the lower left contacts of the impulse units are opened, relay 73 falls back, restoring the stepping circuit through the switch magnet M50, causing this switch to continue stepping until the wipers thereof are at home on points 25.

Operation of relay 63 caused the opening of the right hand break contacts thereof, and the opening of the first three of these contacts interrupted the grounding circuits for the relays 81, 82 and 83 with the result that continued stepping of the counter switch 50 has no effect on these relays, and consequently relays 51, 52 and 53 no longer apply impulses to the third motor being posted, and the indicator dial of this motor remains with the letter D exposed at its window.

When the wipers of switch 50 reach home position or points 25, a circuit is closed from ground on the wiper of level 1 through point 25 thereof and through lamp 14 to battery, energizing this lamp and indicating to the operator or supervisor that posting of the three indicators has been completed. Lamp 14, as will be seen by reference to Fig. 2, is connected directly to point 25 of level 1 of switch 50 so that it is energized at all times that this switch is in home position. From the description of the operation of the three switches 48, 49 and 50, it is apparent that switch 50 is always the last to be returned home after a sequence of operation of these three switches, with the result that illumination of lamp 14 indicates the completion of a write-up. Each one of the switches 48, 49 and 50 makes a complete cycle of operation, i. e., movement from point 25 through the other twenty-four points back to point 25, even though all of the indicator dials associated therewith are not posted. If it is desired to retain one or more of the drums at blank position, the indicator dial associated with this drum or drums will be positioned at the dot or blank point (point No. 1) so that only one impulse will be provided through the series of relays 81, 82 and 83, causing only one impulse to be sent by relay 51, and such impulse only holds the indicator motor in position without turning the same.

*Homing of selector switches*

After write-up operation or posting has been completed, all board row selector switches and the master row selector switch must be returned to home points, and such return is made automatically. When relay 63 is operated, which is an indication that the last indicator motor has been rotated to expose the selected letter on its drum, a circuit is established from ground at the third right make contact of relay 61, through the third right contact of relay 62, second left make contact of relay 63, line 77, wiper of level 2 of master switch 47, from one of the strapped points on this level through line 76', to battery through the right winding of relay 57, causing this relay to operate in the same manner it operated when the switch 18 was operated at the beginning of the posting operation. Relay 57 locks itself in energized condition by a circuit extending from battery at the relay through the first make contact thereof, line 78, to the strapped points of level 1 of switch 47, and to ground at the wiper thereof. Since these points are strapped together, as shown, this circuit is maintained until the wiper of level 1 of switch 47 is moved to point 25.

Operation of relay 57 established an operating circuit for relay 58. The master selector switch 47 is still resting on the point at which it was stopped by a selected key switch K1 to K12, inclusive, but the circuit from the impulse unit through this selected key which originally caused the relay 57 to drop back has been broken at the fourth right break contact of relay 63, with the result that relay 57 will not be caused to fall back by the imposition of current through its opposing left hand winding. Since the switch 47 is at rest on its selected position, the original circuit from the impulse unit to relay 58 is broken so that it is necessary to establish a by-pass circuit to permit operation of relay 58. The operation of relay 63 permits the establishment of such bypass circuit which extends from battery at the upper right contacts of the impulse unit through line 84, third make contact of relay 57, line 170, third left make contact of relay 63, line 171, line 74', through relay 58, to ground.

From the foregoing it will be seen that, when relay 57 picks up after the completion of the setting of the indicator drums, relay 58 will begin operating under the control of the impulse unit, and operation of relay 58 causes repeated operation of the switch magnet M47 of the master switch 47 and also of the switch magnets M35 and M36 of the row selector switches 35 and 36 in the manner explained in connection with the initial selection of desired rows. Operation of relay 58 with its attendant results will continue, causing stepping of the master selector switch and the board selector switches until the master selector switch 47 reaches a condition in which its wipers are on point 25 or home. At that time the ground circuits through levels 1 and 2 of switch 47 will be opened, causing relay 57 to fall back and open the operating circuit for relay 58, which circuit extends through the third make contact of relay 57. At this time all the row selector switches as well as master selector switch 47 are on and will remain on point 25. Lamp 7 will be energized at this time, since its circuit extends from battery through the right break contact of switch 18 to ground on wiper of level 1 of switch 47 when this wiper is on point 25. Illumination of lamp 7 indicates to the operator or supervisor that the master row selector switch is at home position, and illumination of the lamps associated with the group of boards just posted will indicate that the board selector switches are also on home positions.

The circuit previously described whereby lamp 1 on the panel is illuminated when switches 35 and 36 are on home position cannot be completed at this time for the reason that relay 41 has been deenergized in the cycle of operation, and consequently a second circuit must be employed for this purpose. This second circuit utilizes ground applied by relay 43 which has been operated during the final phase of board posting. The lamp circuit for lamp 1 can then be traced from battery at the lamp through line 69 to line 67, line 67', to point 25 on level 6 of switch 35, from the wiper of this level through line 190 to the second break contact of relay 42, line 70 to point 25 of level 6 of switch 36, from the wiper of this level through line 191 to ground at the fourth make contact of relay 43.

Upon the completion of a posting operation, as indicated by illumination of the lamp L7, and the board lamps of the group which was posted, the system is then in condition for further operation. Since the left bank of a row has been posted, the same key switch is then thrown to the right, and bank selection and indicator posting carried out for the right bank of the selected row in the manner hereinbefore described. When switch 18 is manipulated to initiate row and bank selection, relays 61, 62 and 63, which remain energized at the completion of the homing operation, are deenergized by removing ground at switch 18 from each of the relays, the holding circuits of which extend from battery at the respective relays, through line 131, line 132 to ground at switch 18. As the result of this deenergization the holding circuit for relay 93 is broken and the holding circuit for relay 91 is restored, and the system is in complete readiness for normal operation.

*Blanking out*

In addition to posting desired information in the various banks of indicator drums of the different boards, certain banks can be blanked-out when the information appearing thereon is no longer needed. To blank-out an existing posting on the routing boards of either one or both of the groups of boards, the group, row and bank must be selected in the same manner as in the instance of writing up. For blanking out, however, the write-up switch must be moved to the right (Fig. 7) so that all of the pointers of this switch (Fig. 2) are moved into engagement with their upper points. As a result of such movement, the three upper pointers of the switch apply ground to points 24 of level 3 of each of the three indicator switches 48, 49 and 50, and simultaneously the fourth pointer removes ground from the three indicator dial switches, assuring that the indicator counting switches can find ground on no other point than point 24 of each thereof. This movement of the write-up switch also removes battery (by the bottom pointer) from relay 45, which in turn serves as one control for energization of relay 44. The indicator dial switches are not utilized during the blank-out process, and the pointers of each thereof may be at any letter therearound without interfering with the blank-out operation.

When the desired row and bank have been selected by movement of the proper key switch K1 to K12, inclusive, selection is made by operation of switch 18 with the same results attendant upon its operation as described in connection with the initial seelction of row and bank for posting.

After the row and bank selection has been completed, as indicated by the lamp 14 becoming energized, switch 19 can be manipulated to start the blanking out operation. This manipulation starts the first counting switch 48 to stepping in the manner described previously, and such stepping continues until the wiper of level 3 is grounded at the blank-out switch (on point 24 thereof) to operate relay 71 in the same manner as in posting. Stepping of switch 48 causes operation of relays 81, 82 and 83 in sequence in the manner before described, and these three relays in turn control the application of pulsations to the first indicator motor in the left hand bank of row 1, likewise in the previously described manner. During the application of impulses by relays 51, 52 and 53, battery is supplied to these relays by relay 44 which is energized through a circuit extending from battery at the relay through line 195 to one of the homing contacts on the first indicator drum, and then to ground through line 40, point 1 of level 4 of switch 35, wiper of this level and the fourth make contact of relay 41, which was energized as before described when the main power switch was turned on. Relay 44 is dependent upon this circuit which remains closed as long as the indicator drum is in any position other than home position. As soon as the home position of the alphabet drum is reached, this circuit is interrupted by opening of the contacts of the type shown at 27 and 28 in Fig. 10 so that further rotation of the indicator motor is prevented. However, in order that the relay of the group 51, 52 and 53 which steps the indicator motor to home position may not be deprived of operating current before the indicator has settled itself in home position, a source of locking battery is applied to each of these three relays through their first make contacts, and such battery remains applied to each individual relay until its energizing circuit through its allied relay of the group 81, 82 and 83 is broken.

When the wiper of level 3 of switch 48 is grounded on point 24, relay 71 is operated in the manner heretofore described, and immediately following such operation relay 61 is operated again, transferring the control circuits of relays 81, 82 and 83 from switch 48 to switch 49, after which relay 41 falls back, restoring the stepping circuit of switch 48 which steps the wipers of all three levels to point 25, the home position, at which time the stepping circuit is broken.

Indicator switch 49 has its stepping circuit established in the same manner as previously described, and this switch likewise steps through twenty-four positions, reaching ground on point 24 and causing the transmission of such number of impulses by relays 51, 52 and 53 as may be necessary to restore the second indicator drum to home position, at which time the ground circuit on relay 44 which was established by operation of relay 42 is broken. Any additional operations of control relays 81, 82 and 83 will be ineffective to rotate the second indicator motor, since the battery cannot be applied to the three impulse relays.

When the wiper of level 3 of indicator switch 49 reaches point 24, ground is applied thereto to cause operation of relay 72, breaking the stepping circuit of switch 49 and causing energization of relay 62, which in turn transfers the operating circuits of relays 81, 82 and 83 to the first level of switch 50. Upon operation of relay 62, relay 72 is caused to fall back, restoring the stepping circuit for switch 49 which steps to point 25 and then ceases to step due to the breaking of its stepping circuit.

Switch 50 in turn steps through twenty-four positions, applying impulses in sequence to relays 81, 82 and 83, and these relays control the application of impulses to the third counter motor in the manner previously described, it being understood that ground to energize relay 44 was transferred by the operation of relay 43 to the third indicator motor, and ground remains on this circuit until this motor causes its drum to reach home position.

It will be apparent that, while each counting switch steps through its full complement of twenty-four positions, all twenty-four impulses may not be necessary to restore an indicator to the blank position. However, the opening of the home position contacts on each indicator motor prevents more than the requisite number of impulses being applied to the motor being operated.

When relay 51 operates the first time in connection with each of the three indicator motors, it will apply battery to the green, or G, lead of this unit. Such application of energy to the green lead will draw the nearest tooth on the rotor of that motor into line with the magnet poles A energized in this fashion. Normally the blank position or one of the letters C, F, J, M, Q, T and W would be exposed at the window by the motor when the magnet poles supplied by the green lead are energized. Thus, the first pulse will either hold the particular one of these characters in position at the window or will cause the one of the nearest to the exposed letter to be poled in its place, and such movement can be in either direction. For example, if the board being blanked out had the letter A exposed at its window, the first impulse from relay 51 will move the indicator motor backward until blank or dot position is at the window. Similarly, other letters may be moved ahead or moved back until the indicator motor is in step so that subsequent impulses supplied under the control of the other impulse relays will step the motor ahead successively one step until blank is turned into the window.

After switch 50 had been moved to home position following operation of relay 73 and relay 63 and then failure of relay 73, lamp 15 will be energized to indicate to the operator or supervisor that the cycle of operation of the three indicator switches has been completed.

The master selector switch 47 and the board selector switches are then restored to home position in the manner described in connection with posting a board, at the conclusion of which movements lamp 7 and the board lamps on the control panel will be illuminated, indicating that the system is in normal position ready for further blank-out of other banks or rows, which operation can be accomplished in accordance with the foregoing.

While all operations in connection with this system have been described with the assumption that boards of group 1 are to be posted or blanked-out, it is to be understood that boards of group 2 may be posted or blanked-out in the same manner, since each of the relays 81, 82, 83, 58, 91, 92 and 93 have make contacts which are utilized to control the selector switches and the impulse relays of all boards in group 2. The connections of these make contacts through the group switch are shown in the upper right corner of Fig. 3, while the multiples of the group 1 boards are shown in the lower right corner of this same figure. Similarly, all boards of both groups can be posted or blanked-out by proper positioning of the group switch so that circuits from both the group 1 and the group 2 make contacts of the relays shown in Fig. 3 can be completed simultaneously. The only individual circuits extending from the control panel to the individual boards of the two groups are the lamp circuits connected with lamps 1 to 4, inclusive, of group 1 and lamps 8 to 13, inclusive, of group 2. All other circuits between the control panel and the boards of the various groups are arranged in multiple in the two groups so that these boards can be posted simultaneously so far as the boards of each group are concerned.

From the foregoing it will be seen that the present invention provides an indicating system which may comprise a single board, or a plurality of boards, which may be grouped if desired, and methods of operating the same which are novel and which can be carried out under centralized control. It is to be understood that the invention is not to be limited to the illustrated embodiment, but is to be limited only by the scope of the following claims.

What is claimed is:

1. In an indicating system, a plurality of movable members, each having a plurality of indicia thereon, said members being arranged in banks and in rows of banks, individual driving means for each of said members, each of said driving means having a plurality of windings which when energized in repeated sequence cause advance movement of the associated movable member, a control station, selector means controlled at said station for selecting a bank in a desired row, and means controlled at said station for sequentially energizing the windings of the driving means for one of the movable members of the selected bank to move such member to its predetermined setting and for thereafter sequentially energizing the windings of the next driving means to move its movable member to predetermined setting.

2. In an indicating system, a plurality of movable members, each having a plurality of indicia thereon, said members being arranged in banks and in rows of banks, individual driving means for each of said members, each of said driving means having a plurality of windings which when energized in repeated sequence cause advance movement of the associated movable member, a control station, selector means controlled at said station for selecting a bank in a desired row, means controlled at said station for sequentially energizing the windings of the driving means for one of the movable members of the selected bank to move such member to its predetermined setting and for thereafter sequentially energizing the windings of the next driving means to move its movable member to predetermined setting, and means automatically actuated by completion of indicia setting of the last movable member in a bank for restoring said selector means to initial position.

3. In an indicating system, a bank of movable members, each having a plurality of indicia thereon, individual driving means for said members, each of said driving means having a plurality of windings which when energized in repeated sequence cause advance movement of the associated movable member, plural impulse directing means operated in repeated sequences for energizing the windings of said driving means, and individual control means associated with each movable member, said control means being sequentially connected to and disconnected from said impulse directing means to cause impulses to be applied sequentially to the windings of the driving means for one of the movable members to advance it to its predetermined setting and thereafter to the windings of the next driving means to advance its movable member to predetermined setting.

4. In an indicating system, a bank of movable members, each having a plurality of indicia thereon, individual driving means for said members, each of said driving means having a plurality of windings, which when energized in repeated sequence cause advance movement of the associated movable member, plural impulse directing means operated in repeated sequences for energizing the windings of said driving means, transfer members for each individual driving means, said transfer members controlling imposition of impulses by said plural impulse directing means on the windings of their respective driving means, counting switches for determining the number of impulses directed to each driving means, and connections whereby operation of said counting switches in sequence causes operation of said transfer members in sequence to sequentially energize the windings of one of said driving means to move its movable member to predetermined setting and thereafter to energize the windings of the next driving means to move its movable member to predetermined setting.

5. In an indicating system, a board with a plurality of movable members, each having a plurality of indicia thereon, said members being arranged in banks and in rows of banks, individual driving means for each of said members, each of said driving means having a plurality of windings which when energized in repeated sequence cause advance movement of the associated movable member, a control station, switches at said station corresponding to banks in said rows, a master stepping switch at said station controlled by said station switches, stepping switches at said board controlled by said master stepping switch, said station switches, master stepping switch, and board stepping switches cooperating to select in a single operation a bank in a desired row, and means controlled at said station for sequentially energizing the windings of the driving means of one of the movable members of the selected bank to move such member to predetermined settings of indicia thereon, and thereafter for sequentially energizing the windings of the next driving means to move its movable member to predetermined setting.

6. In an indicating system, a bank of individually driven movable members, each having a plurality of indicia thereon, plural impulse directing means operated in repeated sequences to cause movement of a movable member, a control station, selector means at said station for selecting the desired indicia setting for each of said movable members, a stepping switch for each of said movable members, each stepping switch being movable through a series of steps, means for supplying stepping impulses to said switches individually in sequence to cause each thereof to step a predetermined number of steps to operate said impulse directing means in repeated sequences thereby to move the movable member associated with the stepping switch to a setting of indicia thereon predetermined by said selector means, and means for causing each switch to step through the remainder of its series of steps with the movable member associated therewith held at its predetermined setting.

7. In an indicating system, a plurality of movable members, each having a plurality of indicia thereon, individual driving means for said members, a control station, a plurality of setting switches, each associated with a movable member and having indicia thereon corresponding to the indicia on the member, a plurality of stepping switches each connected to a setting switch, means for supplying impulses to step said stepping switches singly in sequence under the control of the respective setting switches, plural impulse directing means for energizing each of said driving means under the control of said stepping switches, and means for transferring control of said plural impulse directing means from one stepping switch to the next as the stepping switches reach their selected settings.

8. In an indicating system, a bank of movable members driven by motors having sets of field coils successively energized to rotate the motors in successive steps, each of said members having a plurality of indicia thereon, a control station, selector means at said station for selecting the desired indicia setting for each of said movable members, a stepping switch for each of said movable members, plural means between said stepping switches and said movable members and controlled by said stepping switches for supplying impulses to rotate said motor step by step thereby to move said movable members, and means for transferring control of said impulses from one stepping switch to the next when the first has made a number of steps predetermined by said selector means.

9. In an indicating system, a bank of movable members driven by motors having sets of field coils successively energized to rotate the motors in successive steps, each of said members having a plurality of indicia thereon, a control station, selector means at said station for selecting the desired indicia setting for each of said movable members, common plural impulse supply means for moving said movable members, a stepping switch for each of said movable members and an impulse directive member associated with each switch whereby stepping of a switch causes impulses to be directed to the movable member associated therewith, said stepping switches being stepped in sequence to move their movable members individually to desired settings of indicia thereon predetermined by said selector means.

10. In an indicating system, a bank of movable members driven by motors having sets of field coils successively energized to rotate the motors in successive steps, each of said members having a plurality of indicia thereon, a control station, common plural impulse supply means for supplying successive impulses to said motors to move said movable members, a stepping switch for each of said movable members and an impulse directive member associated with each switch whereby stepping of a switch causes impulses to be directed to the movable member associated therewith, said stepping switches being stepped in sequence, and means for interrupting direction of impulses to a movable member when said member has been moved to its starting point.

JAMES N. ANDERSON.
RAY HOOVER.